(12) United States Patent
Medvedev

(10) Patent No.: US 7,526,773 B2
(45) Date of Patent: Apr. 28, 2009

(54) PARSING AND HANDLING EVENTS FROM .NET OBJECTS

(75) Inventor: Alexey Medvedev, Leimen (DE)

(73) Assignee: SAP AG, Walldorf (DE)

( * ) Notice: Subject to any disclaimer, the term of this patent is extended or adjusted under 35 U.S.C. 154(b) by 827 days.

(21) Appl. No.: 10/930,712

(22) Filed: Aug. 31, 2004

(65) Prior Publication Data

US 2006/0048110 A1    Mar. 2, 2006

(51) Int. Cl.
*G06F 9/46* (2006.01)
(52) U.S. Cl. .................. 719/318; 717/116
(58) Field of Classification Search .......... 719/318; 717/109, 116
See application file for complete search history.

(56) References Cited

U.S. PATENT DOCUMENTS

| 6,425,120 | B1 * | 7/2002 | Morganelli et al. ......... 717/109 |
| 2003/0195997 | A1 * | 10/2003 | Ibert et al. .................. 709/318 |

OTHER PUBLICATIONS

International Search Report and Written Opinion for international Application No. PCT/IB2005/004097, dated May 29, 2006 (8 pages).

Jabes, "ControlInspector—monitor Windows Forms events as they are fired (like Spy++ for .net)," Internet Article, May 1, 2003 (4 pages).
Snell, "Reflection Part 1: Discovery and Execution," Internet Article, Dec. 2002, (pp. 1-10).
Snell, et al., "Reflection Part 2: Emit," Internet Article, Jan. 1, 2003, (pp. 1-9).

* cited by examiner

*Primary Examiner*—Li B Zhen
*Assistant Examiner*—Phuong N Hoang
(74) *Attorney, Agent, or Firm*—Finnegan, Henderson, Farabow, Garrett & Dunner L.L.P.

(57) ABSTRACT

Methods and apparatus, including computer program products, for parsing and handling events from .NET objects. The method includes generating and initializing an event dispatcher component with a full path of a .NET assembly, the event dispatcher component containing a source .NET component and an object name of the source .NET component type, the event dispatcher component configured to load the .NET assembly and generate an object through reflection, read run-time information from the object about all events, and generate a new .NET assembly and build .NET assembler code that contains event handlers for all events that can be raised by the object.

11 Claims, 2 Drawing Sheets

PARSING AND HANDLING EVENTS FROM .NET OBJECTS

BACKGROUND

The present invention relates to data processing by digital computer, and more particularly to parsing and handling events from .NET objects.

Web services are self-contained, self-describing, modular applications that can be published, located, and invoked across the Web. Web services perform functions, which can be anything from simple requests to complicated business processes. Once a Web service is deployed, other applications (and other Web services) can discover and invoke the deployed service.

The Microsoft .NET Framework is a platform for building, deploying, and running Web Services and applications. The .NET framework provides a productive, standards-based, multi-language environment for integrating existing investments with next-generation applications and services as well as the agility to solve the challenges of deployment and operation of Internet-scale applications.

SUMMARY

The present invention provides methods and apparatus, including computer program products, for parsing and handling events from .NET objects in late-bound mode.

In general, in one aspect, the invention features a method for parsing and handling events from .NET objects including generating and initializing an event dispatcher component with a full path of a .NET assembly, the event dispatcher component containing a source .NET component and an object name of the source .NET component type, the event dispatcher component configured to load the .NET assembly and generate an object through reflection, read run-time information from the object about all events, and generate a new .NET assembly and build .NET assembler code that contains event handlers for all events that can be raised by the object.

In embodiments, the event handlers can be intermediate handlers for particular events, each of the event handlers collecting an event name and event parameters. The event dispatcher component can be further configured to fire a generic ObjectEvent object in the form of public event ObjectEvent(string eventName, System.Array eventParameters). The System.Array event parameters include values for all event parameters.

In another aspect, the invention features an apparatus including a memory, and a processor configured with logic to generate and initialize an event dispatcher component with a full path of a .NET assembly, the event dispatcher component containing a source .NET component and an object name of the source .NET component type, the event dispatcher component configured to load the .NET assembly and generate an object through reflection, read run-time information from the object about all events, and generate a new .NET assembly and build .NET assembler code that contains event handlers for all events that can be raised by the object.

In embodiments the event handlers can be intermediate handlers for particular events, each of the event handlers collecting an event name and event parameters. The event dispatcher component can be further configured to fire a generic ObjectEvent object in the form of public event ObjectEvent(string eventName, System.Array event Parameters). The System.Array event parameters include values for all event parameters.

In another aspect, the invention features a system for parsing and handling events from .NET objects including a means for generating and initializing an event dispatcher component with a full path of a .NET assembly, the event dispatcher component containing a source .NET component and an object name of the source .NET component type, the event dispatcher component including a means for loading the .NET assembly and generating an object through reflection, a means for reading run-time information from the object about all events, and a means for generating a new .NET assembly and building .NET assembler code that contains event handlers for all events that can be raised by the object.

In embodiments, the event handlers can be intermediate handlers for particular events, each of the event handlers collecting an event name and event parameters. The event dispatcher component further can include means for firing a generic ObjectEvent object in the form of public event ObjectEvent(string eventName, System.Array event Parameters). The System.Array event parameters include values for all event parameters.

The invention can be implemented to realize one or more of the following advantages.

A .NET component, referred to as an event dispatcher, provides a bridge between any source .NET component and a client application, which uses this source component in late-bound mode. The event dispatcher component intercepts all events coming from the .NET source component and delivers them to the client application.

The event dispatcher dynamically builds a code in a .NET Assembler language, based on run-time type information of the source component. The code contains intermediate event handlers for each event type of the source component. The intermediate handlers collect all event attributes (e.g., event name and event parameters) and pass them to the event dispatcher component. The event dispatcher component in turn passes this data to the client application in the form of one generic event. The client application can then handle the event, and set return values of output parameters. The event dispatcher handles passing the return values back to the source component.

Other features and advantages of the invention are apparent from the following description, and from the claims.

DETAILED DESCRIPTION

Figure 1:
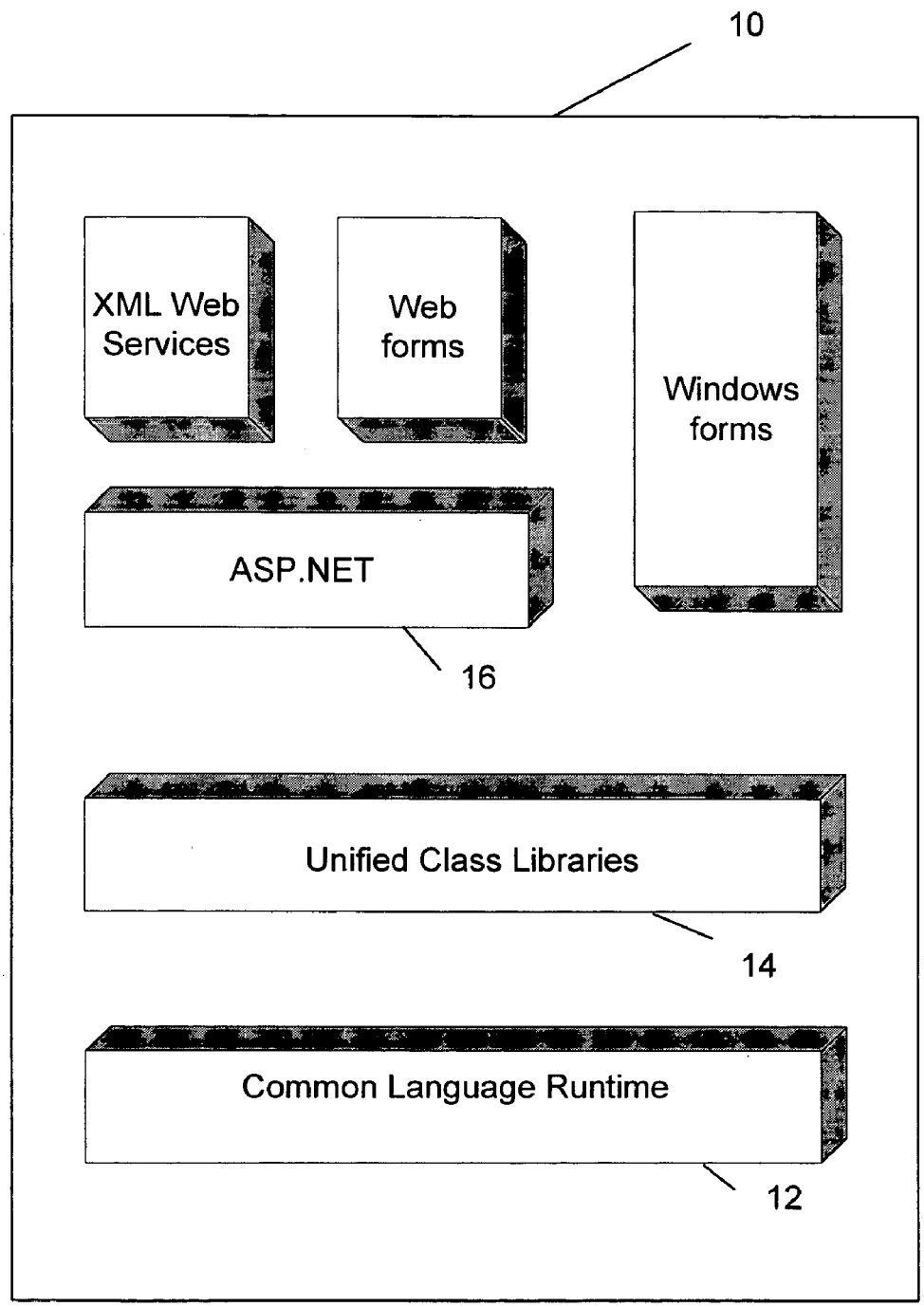
FIG. 1 is a block diagram.

As shown in FIG. 1, a .NET framework 10 includes three main parts, i.e., a common language runtime (CLR) 12, a hierarchical set 14 of unified class libraries, and a componentized version of Active Server Pages called ASP.NET 16. The CLR 12 provides all the runtime services for code, e.g., Just-In-Time compilation, Memory Management, Security and a number of other services.

The hierarchical set 14 is a consistent, object-oriented library of prepackaged functionality.

C# is an object-oriented programming language from Microsoft Corporation that combines the computing power of C++ with the programming ease of Visual Basic. C# is based on C++ and contains features similar to those of Java from Sun Microsystems. Visual Basic .NET (VB.NET) is a version of Microsoft Corporation's Visual Basic that was designed, as part of the company's .NET product group, to make Web services applications easier to develop.

To generate a .NET object in C# or VB.NET, a programmer uses a "new" operator and specifies a name of the object type along with initialization parameters (e.g., SomeClass x=new SomeClass( . . . )). A user of the object can now use properties of the object, call it's methods and handle events. For example, to handle events, the user generates an event handler for a specific event with a corresponding signature. If "Some-Class" has an event "MyEvent" of type "MyEventType" (which is a delegate type in .NET) with two parameters of types "int" and "string" and no return type, the handler will look as follows: void MyHandler (int p1, string p2). The user can attach this event handler to the event (e.g., x.MyEvent=new MyEventType(MyHandler)). This example shows how a user can handle events from objects in .NET, when an object type is initially known at the time of programming and the user's project directly references the SomeClass assembly.

An assembly is the primary building block of a .NET Framework application. It is a collection of functionality that is built, versioned, and deployed as a single implementation unit (e.g., as one or more files). All managed types and resources are marked either as accessible only within their implementation unit, or as accessible by code outside that unit.

Assemblies are self-describing by means of their manifest, which is an integral part of every assembly. The manifest establishes the assembly identity (in the form of a text name), version, culture, and digital signature (if the assembly is to be shared across applications), defines what files (by name and file hash) make up the assembly implementation, and specifies the types and resources that make up the assembly, including which are exported from the assembly. The manifest itemizes the compile-time dependencies on other assemblies and specifies the set of permissions required for the assembly to run properly.

This information is used at run time to resolve references, enforce version binding policy, and validate the integrity of loaded assemblies. The runtime can determine and locate the assembly for any running object, since every type is loaded in the context of an assembly. Assemblies are also the unit at which code access security permissions are applied. The identity evidence for each assembly is considered separately when determining what permissions to grant the code it contains.

In the scenarios that follow, the object type is not known at design time, but only at run-time. For example, the so-called "BlueBox" mechanism in SAP's CRM Mobile Client Framework is written in Common Object Model (COM) technology. Using the BlueBox mechanism, any third party ActiveX components can be used by application developers in mobile applications in "late-bound" mode, without referencing any third party dynamic link libraries (DLLs). ActiveX refers to Microsoft's set of strategic object-oriented programming technologies and tools.

In another example, a test Container for any .NET control is an analog of an ActiveX control test container in COM technology.

In the first example, SAP's user interface (UI) framework provides a special BlueBox container that can host any third party component and enable mobile application developers to use third party COM components, invoke methods and handle events from them. The implementation of BlueBox container in COM is based on a specific COM object, i.e., VBControlExtender, which is provided by Visual Basic 6.0. This COM object generates a source object in "late-bound" mode using objects ProgID, subscribes internally on all events coming from it and, for each new event, fires in turn a generic object event with parameters including original event name, original event parameters, and so forth. State binding is all about finding out which methods to call while a program runs.

In order to port existing mobile client applications to .NET and provide a programming model, we provide a similar BlueBox mechanism in a new edition of .NET mobile technology to interact with any source third party .NET objects. This is important because a large amount of application code exists that handles various third party objects and will be migrated from Visual Basic syntax to VB.NET syntax. This existing application code is structured according to an existing programming model (e.g., COM) and the new BlueBox mechanism is based on .NET principles. For example, eventing models in COM and in .NET are different.

To generate and use a .NET object in "late-bound" mode a developer uses a .NET mechanism called "reflection." Reflection is a mechanism of discovering class information solely at run time. Using reflection it is possible to determine at run-time all the information about an object type, such as, for example, an object class name, object properties, functions, events, and so forth. Reflection also allows one to generate an object, assign properties, and call its methods. The following is an example of using reflection.

First, an assembly is loaded:
Assembly.LoadFrom(@"Some3rdPartyAssembly.dll");
Next, a "late-bound" object is generated:
object    obj=asm.CreateInstance("3rdPartyObjectType-Name");
Finally, a set object property in late-bound fashion is generated:
obj.GetType(    ).Inc=vikeMember("SomeMethod", InvokeMethod, null, obj, new object[ ]{ };

At this stage one has to handle all possible events coming from the "late-bound" .NET object. This is necessary to implement a primary feature of the BlueBox container, i.e., to collect all events raised by a hosted source component and to fire in turn one universal "ObjectEvent."

As described above, to handle events from a .NET object, one first declares in the code an appropriate event handler, whose signature matches a signature of an event to be handled. But one cannot declare such an event handler at the design and coding stage because one does not have information about events and their signatures at the time the code is written. This means that the this code has to be generated at run-time. To provide this functionality we have developed a new component that we refer to as an "EventDispatcher."

The EventDispatcher component enables a "back" interaction with a .NET object that is generated by reflection. The EventDispatcher acts as a bridge between a source .NET component and a client .NET application, which uses the source .NET component in a late-bound mode using the reflection mechanism.

In a particular example, a user generates and initializes the EventDispatcher component with a full path of the .NET assembly, which contains the source .NET component, and the name of the component type:
EvenDispatcher disp=new EventDispatcher( );
disp.Initialize("AssemblyName.dll", ObjectClassName");

In the example above, the EventDispatcher component loads the assembly AssemblyName.dll and generates the object ObjectClassName via reflection. The EventDispatcher component reads run-time type information (which this object has).

Based on the above information, the EventDispatcher component dynamically generates a new .NET assembly and builds .NET assembler code, which contains event handlers for all events that can be raised by the type ObjectClassName. The new .NET assembly resides in memory. Each event handler in this .NET assembly is an "intermediate" handler for a particular event. The .NET assembly does not contain the real handling code, i.e., the actual handling takes places in the client of the EventDispatcher component. The single task of such a handler is to collect event name and event parameters and pass it to the EventDispatcher component. More specifically, the EventDispatcher component obtains the information and fires in turn the generic "ObjectEvent" event:

public event ObjectEvent(string eventName, System.Array eventParameters)

The eventParameters array contains the values for all event parameters. If the event has return parameters, a user of the object can set the values of these parameters in the eventParameters array, and the EventDispatcher component handles returning them back appropriately.

A user of the EventDispatcher component can get the reference to the generated object from the component and use the object in various ways, e.g., place the ActiveX control on the form, call methods, and so forth. All events coming from the object are delivered by the EventDispatcher component in the form of an ObjectEvent. The client can process the event however it desires, set return values to the output parameters, and so forth.

In an example implementation, EventDispatcher gets information about all events, which can be raised by the hosted object, and then uses the System.Reflection.Emit application programming interface (API) to dynamically generate appropriate event handlers with proper signatures, and the code of these handlers in .NET assembler language. This assembler code collects all the event parameters into the array of objects and calls an internal universal handler method, which in turn raises an ObjectEvent event. The dynamically generated handlers are then attached to the source object events (e.g., using the AddHandler method).

Figure 2:
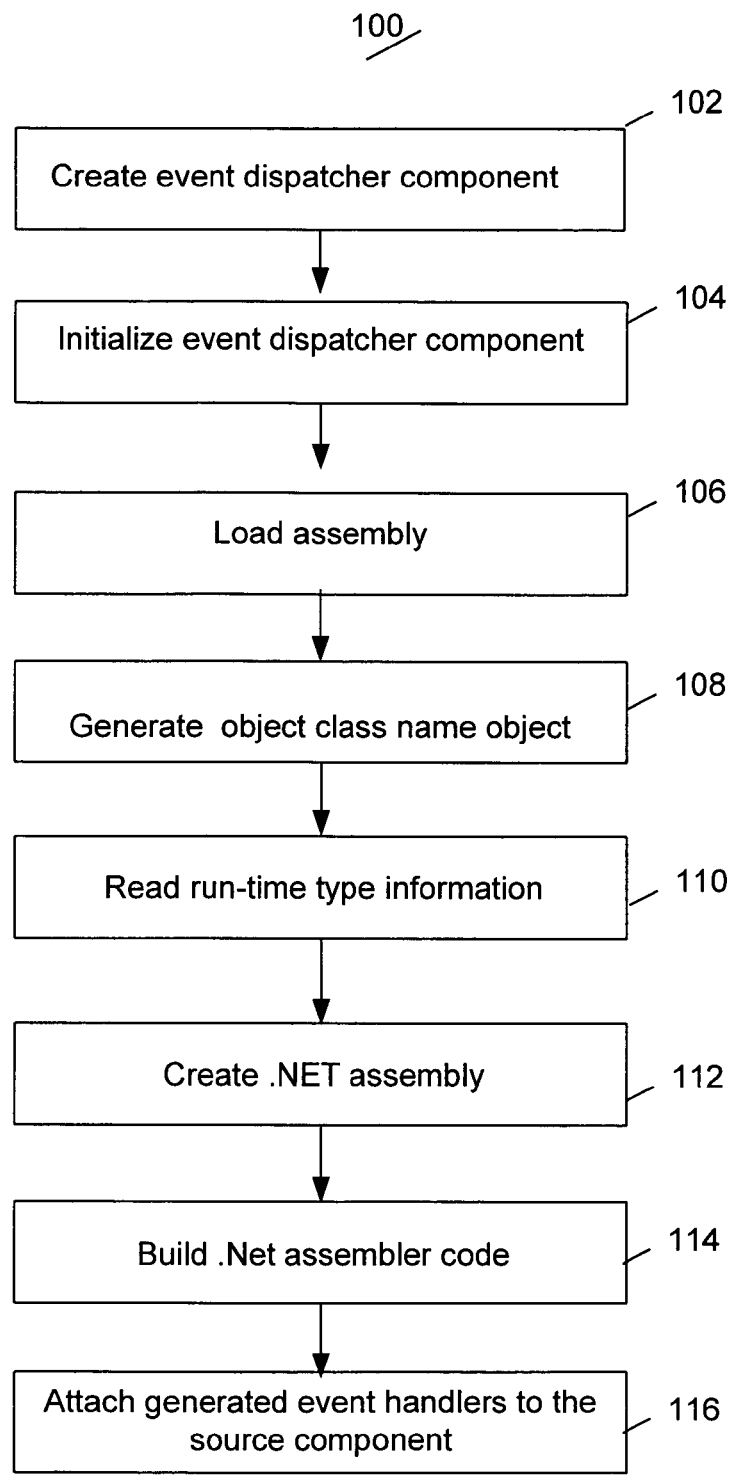
FIG. 2 is a flow diagram.
Like reference numbers and designations in the various drawings indicate like elements.

As shown in FIG. 2, a process 100 for parsing and handling events from .NET objects includes creating (102) and initializing (104) an EventDispatcher component with a full path of a .NET assembly. The .NET assembly contains the source .NET component, and the name of the component type.

The component loads (106) the assembly and creates (108) an object class name object by reflection. The component reads (110) run-type information from the object.

The component dynamically generates (112) a new .NET assembly and builds (114).NET assembler code. The .NET assembler code contains event handlers for all events that can be raised by object class name object. The new .NET assembly resides in memory. Each event handler in this .NET assembly is an "intermediate" handler for a particular event. The .NET assembly does not contain the real handling code, i.e., the actual handling takes places in the a client of the EventDispatcher component. The task of such a handler is to collect event name and event parameters and pass it to the EventDispatcher component.

Process 100 attaches (116) the generated event handler to the source component.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method of parsing and handling source events, the method comprising:
    generating and initializing an event dispatcher component with a full path of a .NET assembly, the event dispatcher component containing a source .NET component and an object name of the source .NET component type, the event dispatcher component configured to:
    load the .NET assembly and generate a source .NET object through reflection;
    read run-time information from the source .NET object about source events that can be raised by the source NET object;
    generate a new .NET assembly and build .NET assembler code that contains intermediate event handlers corresponding to the source events that can be raised by the source .NET object;
    handle the source events as the source events are raised by the source .NET object, the raised source events being handled using the intermediate event handlers, and
    fire a generic public event when the source events are raised, the generic public event including parameters passed by the raised source events.

2. The method of claim 1 wherein the intermediate event handlers collect source event name for the corresponding source events from the source .NET object.

3. The method of claim 1 wherein the generic public event takes the form ObjectEvent(string eventName, System.Array event Parameters) and the System.Array event parameters include values for all the parameters passed by the raised source events.

4. The method according to claim 1, wherein the generic public event is handled by a client object of the event handler.

5. The method according to claim 4, the event dispatcher being further configured to:
    determine whether events raised by the source .NET object have return parameters, and
    return the return parameters from the client object to the source .NET object.

6. An apparatus comprising:
    a memory; and
    a process configured with logic to:
    generate and initialize an event dispatcher component with a full path of a .NET assembly, the event dispatcher component containing a source .NET component and an object name of the source .NET component type, the event dispatcher component configured to:
    load the .NET assembly and generate a source .NET object through reflection;
    read run-time information from the source .NET object about source events that can be raised by the source .NET object;
    generate a new .NET assembly and build .NET assembler code that contains intermediate event handlers corresponding to the source events that can be raised by the source NET object;
    handle the source events as the source events are raised by the source .NET object, the raised source events being handled using the intermediate event handlers, and
    fire a generic public event when the source events are raised, the generic public event including parameters passed by the raised source events.

7. The apparatus of claim 6 wherein the intermediate event handlers collect a source event name for the corresponding source events from the source .NET object.

8. The apparatus of claim 6 wherein the generic public event takes the form ObjectEvent(string eventName, System.Array event Parameters) and the System .Array event parameters include values for all event parameters passed by the raised source events.

9. A machine-readable storage device containing instructions for causing a processor to perform a method for parsing and handling source events, the method comprising:
    generating and initializing an event dispatcher component with a full path of a .NET assembly, the event dispatcher component containing a source .NET component and an object name of the source .NET component type, the event dispatcher component configured to:
    load the .NET assembly and generate a source .NET object through reflection;
    read run-time information from the source .NET object about source events that can be raised by the source .NET object;
    generate a new .NET assembly and build .NET assembler code that contains intermediate event handlers corresponding to the source events that can be raised by the source .NET object;
    handle the source events as the source events are raised by the source .NET object, the raised source events being handled using the intermediate event handlers, and
    fire a generic public event when the source events are raised, the generic public event including parameters passed by the raised source events.

10. The device of claim 9 wherein the intermediate event handlers collect a source event name for the corresponding source events from the source .NET object.

11. The device of claim 9 wherein the generic public event takes the form ObjectEvent(string eventName, System.Array event Parameters) and the System.Array event parameters include values for all the parameters passed by the raised source events.

* * * * *